United States Patent
Kakinuma et al.

[11] Patent Number: 5,906,768
[45] Date of Patent: May 25, 1999

[54] FERRITE MAGNETIC MATERIAL, AND FERRITE CORE

[75] Inventors: Sei Kakinuma; Yutaka Saito, both of Akita; Kensuke Ara, Chiba, all of Japan

[73] Assignee: TDK Corporation, Tokyo, Japan

[21] Appl. No.: 08/832,769

[22] Filed: Apr. 4, 1997

[30] Foreign Application Priority Data

Apr. 3, 1996 [JP] Japan ................................. 8-106345

[51] Int. Cl.⁶ ........................................................ H01F 1/34
[52] U.S. Cl. .................. 252/62.62; 252/62.6; 336/233; 336/173; 363/121; 315/500; 315/501; 322/355
[58] Field of Search ................... 252/62.6, 62.62; 336/233, 173; 322/355; 363/171; 315/500, 501

[56] References Cited

FOREIGN PATENT DOCUMENTS

| | | |
|---|---|---|
| 62-56358 | 3/1987 | Japan . |
| 63-127506 | 5/1988 | Japan ................................. 252/62.6 |
| 1-101609 | 4/1989 | Japan . |
| 1-101610 | 4/1989 | Japan . |
| 6-267724 | 9/1994 | Japan . |
| 1355015 | 7/1994 | Russian Federation . |

*Primary Examiner*—Melissa Koslow
*Attorney, Agent, or Firm*—Oblon, Spivak, McClelland, Maier & Neustadt, P.C.

[57] ABSTRACT

A ferrite core of the invention is useful for reducing the power loss of Ni—Cu—Zn ferrites, and so for particle accelerators, and power transformers. This core comprises a ferrite magnetic material containing as major components 47 to 50 mol % of iron oxide calculated as $Fe_2O_3$, 10 to 25 mol % of nickel oxide calculated as NiO, 2 to 15 mol % of copper oxide calculated as CuO and 15 to 35 mol % of zinc oxide calculated as ZnO, and further containing as subordinate components 0.05 to 1.5 wt % of cobalt oxide calculated as CoO, 0.05 to 0.8 wt % of tungsten oxide calculated as $WO_3$ and 0.03 to 0.5 wt % of bismuth oxide calculated as $Bi_2O_3$, all based on the major components. Consequently, there is achieved a ferrite core having a power loss at 100° C. of up to 210 kW/m³, and a power loss at 25° C. of up to 140 kW/m³, as measured at f·Bm product=25 kTHz (f=1 to 10 MHz).

7 Claims, 9 Drawing Sheets

FERRITE MAGNETIC MATERIAL, AND FERRITE CORE

BACKGROUND OF THE INVENTION

1. Technical Field

The present invention relates to a low-resistance and low-loss ferrite magnetic material, and a ferrite core for power transformers or accelerators.

2. Background Art

Soft magnetic ferrites are often used for cores of inductance elements of power transformers, choke coils, etc.

Ni—Cu—Zn ferrites, because of having a high specific resistance of $1 \times 10^8$ $\Omega \cdot$cm or more, are suitable for inductance elements for high-frequency purposes. For instance, JP-A-62-56358 discloses to apply them to low-pass filter cores, JP-A-1-101609 to apply them to inductors used at high frequencies of 1 MHz or more, and JP-A-1-101610 to apply them to chip inductors used at high frequencies of 1 MHz or more. With such ferrites, cost reductions are achievable because they can be directly wound with no provision of insulating coatings on their surfaces, as set forth in JP-A-62-56358.

However, difficulty is involved in using Ni—Cu—Zn ferrites for power transformer cores because their power loss is relatively large.

Generally, Mn—Zn ferrites are used as a core material for power transformers, and contain various subordinate components to make power loss low. However, the Mn—Zn ferrites are unsuitable for high-frequency purposes due to their specific resistance being as low as about $1 \times 10^3$ $\Omega \cdot$cm, and cannot be wound directly into a core as well.

Among ferrite materials known for particle accelerators there is an Ni—Cu—Zn system having such a basic composition as set forth in the aforesaid JP-A-62-56358. However, this composition system has high power loss as already mentioned, and so presents some considerable obstruction to achieving performance improvements, for instance, making the efficiency and energy of accelerators high. It has also been known so far in the art that Q characteristics are improved by the addition of CoO to Ni—Cu—Zn ferrites. Shown in FIGS. 13 and 14 are power losses and $\mu$Qf products of a conventional basic composition consisting of 49 mol % of $Fe_2O_3$, 3 mol % of CuO, 18 mol % of NiO and 30 mol % of ZnO with 0.1 to 1.0 wt % of CoO added thereto, as measured at 1 MHz–25 mT, room temperature (RT), and 100° C. With 0.04 mol % of CoO added, a power loss of 240 kW/m³ is obtained at 100° C. or a 27% reduction is achieved as compared with that achieved so far (330 kW/m³), with a $\mu$Qf product of $9 \times 10^9$, as can be seen from these figures. However, this value is still less than satisfactory for the aforesaid purposes, and so much more loss reductions are now desired.

DISCLOSURE OF THE INVENTION

An object of the present invention is to reduce the power loss of an Ni—Cu—Zn ferrite, thereby achieving a ferrite core useful for particle accelerators, and power transformers.

Such an object is accomplished by the invention defined below as (1) to (17).

(1) A ferrite magnetic material containing as major components 47 to 50 mol % of iron oxide, calculated as $Fe_2O_3$,
10 to 25 mol % of nickel oxide, calculated as NiO,
2 to 15 mol % of copper oxide, calculated as CuO, and
15 to 35 mol % of zinc oxide, calculated as ZnO, and further containing as subordinate components
0.05 to 1.5 wt % of cobalt oxide, calculated as CoO,
0.05 to 0.8 wt % of tungsten oxide, calculated as $WO_3$, and
0.03 to 0.5 wt % of bismuth oxide, calculated as $Bi_2O_3$, all based on said major components.

(2) The ferrite magnetic material of the above (1), wherein contents of said major components are 47 to 50 mol % for the iron oxide, calculated as $Fe_2O_3$,
10 to 25 mol % for the nickel oxide, calculated as NiO,
2 to 10 mol % for the copper oxide, calculated as CuO, and
25 to 35 mol % for the zinc oxide, calculated as ZnO.

(3) The ferrite magnetic material of the above (2), wherein a content of the iron oxide in said major components is 48 to 50 mol %, calculated as $Fe_2O_3$.

(4) The ferrite magnetic material of the above (1), wherein contents of said subordinate components based on said major components are 0.1 to 1.1 wt % for the cobalt oxide, calculated as CoO,
0.06 to 0.75 wt % for the tungsten oxide, calculated as $WO_3$, and
0.06 to 0.35 wt % for the bismuth oxide, calculated as $Bi_2O_3$.

(5) The ferrite magnetic material of the above (4), wherein the contents of said subordinate components based on said major components are 0.1 to 0.9 wt % for the cobalt oxide, calculated as CoO,
0.1 to 0.5 wt % for the tungsten oxide, calculated as $WO_3$, and
0.1 to 0.3 wt % for the bismuth oxide, calculated as $Bi_2O_3$.

(6) A ferrite core comprising a ferrite magnetic material containing as major components 47 to 50 mol % of iron oxide, calculated as $Fe_2O_3$,
10 to 25 mol % of nickel oxide, calculated as NiO,
2 to 15 mol % of copper oxide, calculated as CuO, and
15 to 35 mol % of zinc oxide, calculated as ZnO, and further containing as a subordinate component at least tungsten oxide at a content of 0.01 to 0.8 wt %, calculated as $WO_3$ and based on said major component, said ferrite core having a power loss at 100° C. of up to 210 kW/m³ and a power loss at 25° C. of up to 140 kW/m³, as measured at f·Bm product=25 kTHz where f is a frequency of 1 to 10 MHz, and Bm is a maximum magnetic flux density.

(7) The ferrite core of the above (6), wherein contents of said major components are 47 to 50 mol % for the iron oxide, calculated as $Fe_2O_3$,
10 to 25 mol % for the nickel oxide, calculated as NiO,
2 to 10 mol % for the copper oxide, calculated as CuO, and
25 to 35 mol % for the zinc oxide, calculated as ZnO.

(8) The ferrite core of the above (7), wherein a content of the iron oxide in said major components is 48 to 50 mol %, calculated as $Fe_2O_3$.

(9) The ferrite core of the above (8), wherein contents of said subordinate components based on said major components are 0.05 to 1.5 wt % for the cobalt oxide, calculated as CoO,
0.05 to 0.8 wt % for the tungsten oxide, calculated as $WO_3$, and
0.03 to 0.5 wt % for the bismuth oxide, calculated as $Bi_2O_3$.

(10) The ferrite core of the above (9), wherein the contents of said subordinate components based on said major components are 0.1 to 1.1 wt % for the cobalt oxide, calculated as CoO, 0.06 to 0.75 wt % for the tungsten oxide, calculated as $WO_3$, and 0.06 to 0.35 wt % for the bismuth oxide, calculated as $Bi_2O_3$.

(11) The ferrite core of the above (10), wherein the contents of said subordinate components based on said major components are 0.1 to 0.9 wt % for the cobalt oxide, calculated as CoO, 0.1 to 0.5 wt % for the tungsten oxide, calculated as $O_3$, and 0.1 to 0.3 wt % for the bismuth oxide, calculated as $Bi_2O_3$.

(12) The ferrite core of the above (8), which is used or a particle accelerator.

(13) The ferrite core of the above (8), which is used for a power transformer for high-frequency switching at 1 to 10 MHz.

(14) A ferrite core comprising a ferrite magnetic material containing as major components 47 to 50 mol % of iron oxide, calculated as $Fe_2O_3$, 10 to 25 mol % of nickel oxide, calculated as NiO, 2 to 15 mol % of copper oxide, calculated as CuO, and 15 to 35 mol % of zinc oxide, calculated as ZnO, and further containing as a subordinate component at least tungsten oxide at a content of 0.01 to 0.8 wt %, calculated as $WO_3$ and based on said major component, said ferrite core having a minimum value of power loss at 20 to 150° C. of up to 300 $kW/M^3$, as measured at f·Bm product =7.5 kTHz where f is a frequency of 1 kHz to 1 MHz, and Bm is a maximum magnetic flux density.

(15) The ferrite core of the above (14), wherein a content of the iron oxide in said major components is 48 to 50 mol %, calculated as $Fe_2O_3$.

(16) The ferrite core of the above (15), wherein said subordinate component contains at least tungsten oxide at a content of 0.01 to 0.5 wt %, calculated as $WO_3$ and based on said major components.

(17) The ferrite core of the above (16), which is used for a power transformer of less than 1 MHz.

ACTION-EFFECT

The ferrite magnetic material of the present invention comprises an Ni—Cu—Zn ferrite to which given amounts of $WO_3$, CoO, and $Bi_2O_3$ are added as subordinate components. By adding such oxides as the subordinate components, it is possible to reduce loss remarkably. For this reason, the ferrite magnetic material of the present invention is suitable for a power transformer core almost unachievable with conventional Ni—Cu—Zn ferrites. In addition, the ferrite magnetic material of the present invention has high specific resistance as is the case with conventional Ni—Cu—Zn ferrites, and can provide an inexpensive core because it can be wound directly into a core without recourse to an insulating coating.

When a certain current is passed through a transformer, the resulting voltage Vm is given by $$Vm = 2\pi f n \cdot A \cdot Bm$$

where f is a frequency, n is the number of turns, A is a sectional area of the core, and Bm is a maximum magnetic flux density. Here, core loss $P_{cv}$ is proportional to the square to cube of Bm.

Now, consider the case where the $P_{cv}$ of material a is 50 and the $P_{cv}$ of material b is 10 under a typical condition of 1 MHz–25 mT. Even when the maximum magnetic flux density Bm applied on material b is approximately doubled or increased to 50 mT, the $P_{cv}$ values of both materials a and b are still of the same magnitude. From the aforesaid equation, therefore, it is found that for obtaining the same level of Vm for materials a and b, the sectional area of a core of material b may be a half of that of material a as long as the same conditions hold for f and n. It follows that the same level of Vm can be obtained at low $P_{cv}$ even when core size is small; that is, $P_{cv}$ reductions are of vital significance to make part size small.

In addition, the ferrite magnetic material of the present invention lends itself to cores of particle accelerators having applications in scientific research, medical fields, etc. In other words, cores comprising the ferrite magnetic material of the present invention are effective for increasing the outputs of particle accelerators due to their reduced low loss.

Broadly speaking, ferrite material for accelerators is required to have two typical characteristics, a large μQf product, and low Q-loss effect (i.e., a Q drop found when direct current bias is applied to the material). To obtain a large μQf product (or to reduce core loss) is generally achieved by incorporating CuO or CoO in the material. However, the incorporation of these is unfavorable for ferrite material for accelerating purposes due to the occurrence of the Q-loss effect.

The ferrite magnetic material of the present invention, even when it contains CoO, is practically acceptable, and is extremely effective for achieving high outputs due to considerable core loss reductions, with some tradeoffs expected in other negative action due to the Q-loss effect, as will be described in the examples to be given later. Thus, this ferrite magnetic material has very excellent characteristics for accelerator cores. Especially when the instant ferrite magnetic material is applied to some particle accelerators unlikely to produce the Q-loss effect due to the absence of any direct current bias, extremely satisfactory results are obtainable because good use is made of its remarkable effect on reducing core loss.

Claim 1 of the aforesaid JP-A-1-101609 recites a high-frequency magnetic material comprising an Ni—Cu—Zn ferrite containing 0.05 to 1.0 wt % of $Co_3O_4$ and 0.05 to 4.0 wt % of $SiO_2$, and claim 8 recites that 0.1 to 12 wt % of $Bi_2O_3$ is further added to the material. However, the publication says nothing about the addition of $WO_3$, and so discloses an invention distinguishable from the present invention. Nor is there any example using $Co_3O_4$ and $Bi_2O_3$ in combination. The magnetic material described in the publication is applied to inductors used on TVs, video tape recorders, etc. In this connection, the publication alleges that the effect of the invention is that circuit reliability is improved by reducing inductance changes incidental to pressurization or magnetic field changes. In other words, the magnetic material described in the publication is suitable for so-called signal-related inductors, and is in sharp contrast to the ferrite magnetic material of the present invention that is a so-called power-related material. Of vital importance to the latter is low loss because power input is considerably high. In this regard, too, the invention set forth in the publication is distinguishable from the present invention.

SPECIFIC EMBODIMENTS

Figure 1:
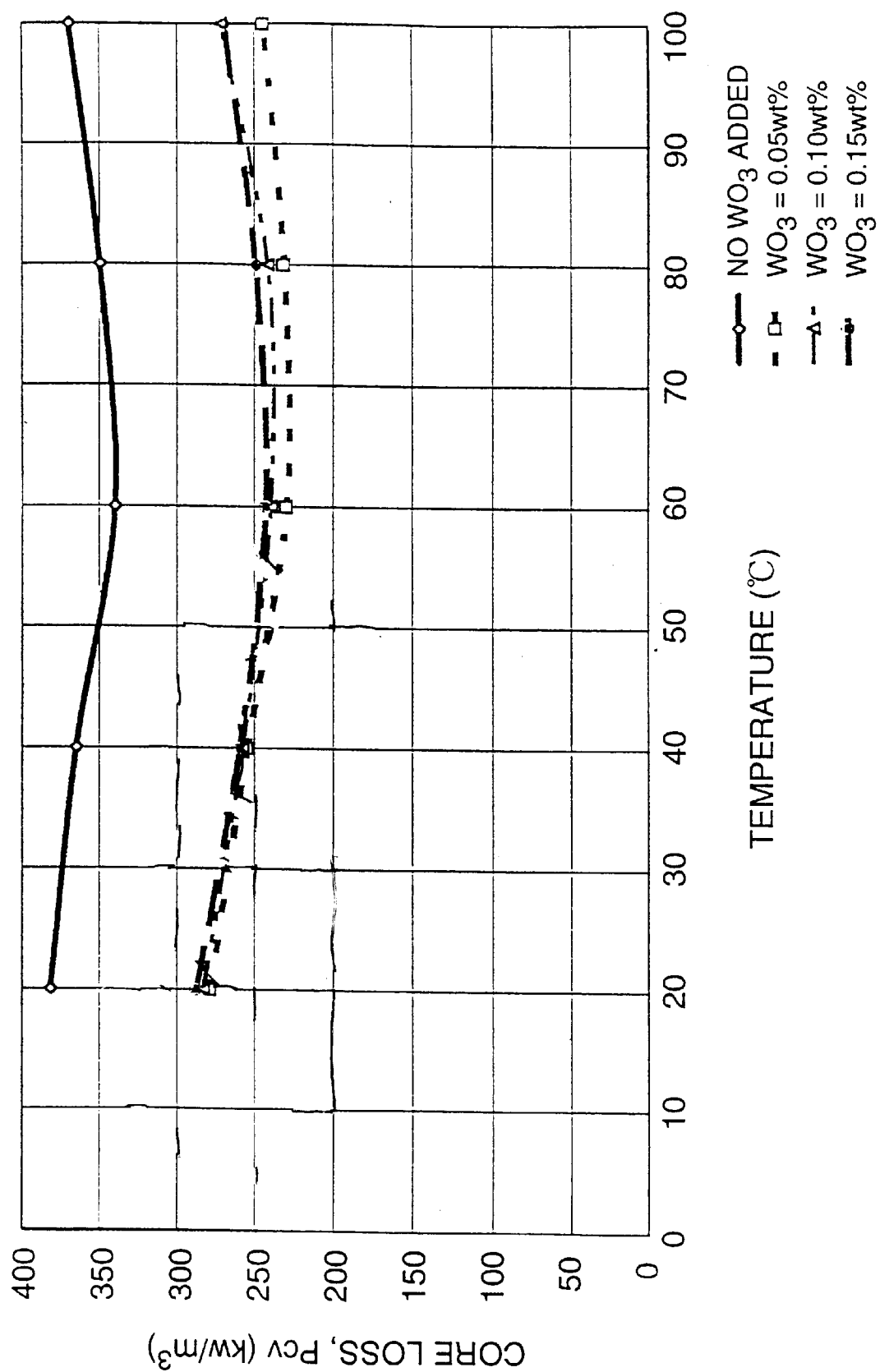
FIG. 1 is a graph obtained by plotting core losses $P_{cv}$ of samples of composition 1, with 0 to 0.15 wt % of $WO_3$ added thereto, as measured under conditions: 50 kHz–150 mT, and 20 to 100° C.

Specific embodiments of the present invention will now be explained at great length.

The ferrite magnetic material of the present invention contains as major components 47 to 50 mol % of iron oxide, calculated as $Fe_2O_3$, 10 to 25 mol % of nickel oxide, calculated as NiO, 2 to 15 mol % of copper oxide, calculated as CuO, and 15 to 35 mol % of zinc oxide, calculated as ZnO, and further contains as subordinate components 0.05 to 1.5 wt % of cobalt oxide, calculated as CoO, 0.05 to 0.8 wt % of tungsten oxide, calculated as $WO_3$, and 0.03 to 0.5 wt % of bismuth oxide, calculated as $Bi_2O_3$, all based on said major components.

Preferable contents of the major components are 47 to 50 mol % for the iron oxide, calculated as $Fe_2O_3$, 10 to 25 mol % for the nickel oxide, calculated as NiO, 2 to 10 mol % for the copper oxide, calculated as CuO, and 25 to 35 mol % for the zinc oxide, calculated as ZnO.

Alternatively, the content of the iron oxide in said major components may be 48 to 50 mol %, calculated as $Fe_2O_3$.

Preferable contents of the subordinate components based on the major components are 0.1 to 1.1 wt % for the cobalt oxide, calculated as CoO, 0.06 to 0.75 wt % for the tungsten oxide, calculated as $WO_3$, and 0.06 to 0.35 wt % for the bismuth oxide, calculated as $Bi_2O_3$.

Particularly preferable contents of the subordinate components based on the major components are 0.1 to 0.9 wt % for the cobalt oxide, calculated as CoO, 0.1 to 0.5 wt % for the tungsten oxide, calculated as $WO_3$, and 0.1 to 0.3 wt % for the bismuth oxide, calculated as $Bi_2O_3$.

When the content of the iron oxide component in the major composition is less than 47 mol % calculated as $Fe_2O_3$, there is an increase in the amount of a non-magnetic layer formed, which in turn causes an increased core loss. When the content of $Fe_2O_3$ in the major composition exceeds 50 mol %, on the other hand, sinterability becomes much worse. The content of the iron oxide component is preferably as close to 50 mol % as possible, but should not exceed 50 mol %.

The nickel component gives rise to an increased core loss when the content thereof in the major composition is less than 10 mol % calculated as NiO, and incurs some considerable expense when the content thereof exceeds 25 mol %.

When the content of the copper oxide component in the major composition is less than 2 mol % calculated as CuO, sinterability becomes worse. At more than 15 mol %, on the other hand, there is a decrease in the relative content of nickel oxide, which in turn leads to an increased core loss.

When the content of the zinc oxide component in the major composition is less than 15 mol % calculated as ZnO, there is a permeability drop. At more than 35 mol %, on the other hand, there is a Curie temperature drop.

Shown in Table 1 are values of core loss as measured with varying major compositions (RT denoting room temperature).

TABLE 1

| $Fe_2O_3$ (mol %) | NiO (mol %) | CuO (mol %) | ZnO (mol %) | Core Loss (1 MHz-25 mT at RT) (kW/m$^3$) |
|---|---|---|---|---|
| 49.15 | 15.35 | 7.0 | 28.5 | 330 |
| 49.0 | 18.0 | 3.0 | 30.0 | 300 |
| 47.0 | 20.0 | 3.0 | 30.0 | 350 |
| 47.0 | 16.0 | 7.0 | 30.0 | 380 |
| 47.0 | 9.0 | 15.0 | 30.0 | 800 |
| 49.0 | 6.0 | 15.0 | 30.0 | 600 |
| 49.0 | 11.0 | 10.0 | 30.0 | 400 |

As can be seen from Table 1, the optimum range of the major composition is 47 to 50 mol % of the iron oxide, calculated as $Fe_2O_3$, 10 to 25 mol % of the nickel oxide, calculated as NiO, 2 to 15 mol % of the copper oxide, calculated as CuO, and 15 to 35 mol % of the zinc oxide, calculated as ZnO, and preferably 47 to 50 mol % of the iron oxide, calculated as $Fe_2O_3$, 10 to 25 mol % of the nickel oxide, calculated as NiO, 2 to 10 mol % of the copper oxide, calculated as CuO, and 25 to 35 mol % of the zinc oxide, calculated as ZnO.

Alternatively, the content of the iron oxide in the aforesaid major components may be 48 to 50 mol % calculated as $Fe_2O_3$.

One ferrite core of the present invention comprises the aforesaid ferrite magnetic material, and has a power loss at 100° C. of up to 210 kW/m$^3$ and a power loss at 25° C. of up to 140 kW/m$^3$, as measured at f·Bm product=25 kTHz where f is a frequency of 1 to 10 MHz, and Bm is a maximum magnetic flux density. This ferrite core is preferably used as a high-frequency power transformer core operated at a frequency of at least 1 MHz, or an accelerator core.

Another ferrite core of the present invention comprises a ferrite magnetic material containing as major components 47 to 50 mol % of iron oxide, calculated as $Fe_2O_3$, 10 to 25 mol % of nickel oxide, calculated as NiO, 2 to 15 mol % of copper oxide, calculated as CuO, and 15 to 35 mol % of zinc oxide, calculated as ZnO, and further contains as a subordinate component at least tungsten oxide at a content of 0.01 to 0.8 wt %, calculated as $WO_3$ and based on said major component, said ferrite core having a minimum value of power loss at 20 to 150° C. of up to 300 kW/m$^3$, as measured at f·Bm product=7.5 kTHz where f is 1 kHz to 1 MHz. This ferrite core is preferably used as a power transformer core operated at a frequency of up to 1 MHz.

Explained below are the reasons for specifying the contents of the subordinate components. The addition of $WO_3$ gives rise to a remarkable core loss reduction particularly over a low-frequency region of up to 1 MHz, and more particularly over a region of 1 kHz to 1 MHz. When $WO_3$ is added to a ferrite material in an amount exceeding 0.8 wt %, the dependence of the material on firing temperature becomes unacceptably large. At less than 0.01 wt %, the addition of $WO_3$ becomes insignificant. It is preferable that the tungsten oxide is added in an amount of 0.01 to 0.5 wt % calculated as $WO_3$. The addition of at least 0.05 wt % of the tungsten oxide is preferable because a minimum value of core loss (power loss) of up to 300 kW/m$^3$ is obtained at 20 to 150° C., f=1 kHz to 1 MHz, and f·Bm product=7.5 kTHz where Bm is a maximum permeability. This value is particularly favorable for transformers of switching power sources, inverters, etc. in a low-frequency region.

The ferrite magnetic material of the present invention contains CoO and $Bi_2O_3$ in addition to the tungsten oxide. By the combined addition of these, core loss is much more reduced particularly at 1 MHz or higher, and more particularly over a high-frequency region of 1 to 10 MHz. When at least one of these is too much or too little, the effect on core loss reductions becomes slender. In addition, the use of too much subordinate components results in a permeability drop.

The ferrite magnetic material of the present invention has a great effect on core loss reductions in a wide temperature range of about 25 to 100° C. To reduce core loss particularly in a low temperature range, for instance, in a range from 25° C. to less than 60° C., it is preferable that the content of the cobalt oxide is set at 0.2 wt % or more. To reduce core loss especially in a high temperature range, for instance, in a 60 to 100° C. range, it is desired that the subordinate components be used at the aforesaid preferable contents. By the application of the present invention, core loss at 25° C. can be reduced to 140 kW/m$^3$ or less under typical conditions of 1 MHz and 25 mT, and core loss at 100° C. can be reduced to 210 kW/m$^3$ or less under the same conditions.

It is to be noted that the ferrite magnetic material of the present invention may contain other elements in the form of trace additives or inevitable impurities. For such elements, for instance, mention is made of at least one of Si, Ca, P, Cr, etc. The total content of these elements is preferably up to 2,000 ppm calculated as metals.

The content of each of the major, and subordinate components mentioned above is calculated on the assumption that each metal present in the ferrite magnetic material exists in the form of an oxide having the aforesaid stoichiometric composition. It is to be noted that the ferrite magnetic material usually contains each metal oxide in the form of a stoichiometric composition, but may contain it in the form of a composition deviating slightly from the stoichiometric value.

Preferably, the ferrite magnetic material of the present invention is used to fabricate a ferrite core usually in the manner to be described below.

First, a mixture of raw materials for the major, and subordinate components is prepared. As the raw materials for the major components, use may be made of those usually employed for Ni—Cu—Zn ferrite production, that is, oxides or various compounds converted into oxides by firing. The materials for the major components are mixed together such that the final ferrite composition is obtained at the aforesaid quantitative ratio. As the raw materials for the subordinate components, use may again be made of oxides of various metals or compounds converted into oxides by firing.

Then, the mixture of the raw materials for the major, and subordinate components is calcined. Calcination may be done in an oxidizing atmosphere, usually, in the air. Preferably, the calcination is carried out at a temperature of 800 to 1,000° C. for a time period of 1 to 3 hours.

The calcined product is pulverized, and then formed into a toroidal or other desired shape with the addition of a suitable amount of a suitable binder such as polyvinyl alcohol.

Then, the formed product is fired. Firing may be done in an oxidizing atmosphere, usually in the air. Preferably, the firing is carried out at a temperature of 900 to 1,100° C. for a time period of 2 to 5 hours.

The thus obtained ferrite material has preferably a grain size of about 0.5 to 6 pm, especially about 1 to 3 pm. Grain size departing from both 0.5 pm and 6 pm causes characteristics to become worse.

Preferably, the core fabricated by using the ferrite material of the present invention is used for power transformers for switching, inverter and other purposes, or it is used as a so-called power-related material. Core shape, to which the present invention is applied, is not critical, and so the present invention may be applied to various forms of cores such as toroidal, EE, EI, EER, UU, UI, drum, pot, and cup forms of cores. The ferrite core of the present invention may also be used for other power-related purposes, for instance, as a core for choke coils or the like.

In addition, the ferrite material of the present invention is useful as a power core for particle accelerators, and especially as a high-frequency cavity core for the generation of accelerating voltage.

EXAMPLES

The present invention will now be explained in more detail with reference to specific examples.

[Example 1]

Prepared was a mixture of the raw materials for the major components, $Fe_2O_3$, NiO, CuO, and ZnO with the raw material for the subordinate component, $WO_3$.

The raw materials for the major, and subordinate components were weighed and mixed together such that the following composition 1 was obtained. The mixture was calcined at 800 to 900° C. for 2 hours in the air, and then pulverized. The resulting powders were formed under pressure with the addition of a binder (PVA) thereto. The formed product was fired at 1,000 to 1,200° C. for 2 hours in the air to obtain a toroidal sample of 18 mm in outer diameter, 10 mm in inner diameter, and 5 mm in height.

(Composition 1)
Major Components
$Fe_2O_3$:49.25 mol %
NiO:13.5 mol %
CuO:6 mol %
ZnO:31.25 mol %
Subordinate Component (on the assumption that the total amount of the major components was 100 wt %)
$WO_3$:0 to 0.15 wt %

Core loss ($P_{cv}$) at 20 to 100° C., 50 kHz, and 150 mT was measured for each of the samples containing 0, 0.05, 0.10, and 0.15 wt % of $WO_3$ by means of a B–H analyzer. The results are depicted in FIG. 1. Initial permeability, saturation flux density, and surface resistance were also measured. The results are set out in Table 2.

TABLE 2

| Sample | $WO_3$ (wt %) | Initial Permeability | Saturation Flux Density (mT) | Surface Resistance (Ω) |
|---|---|---|---|---|
| 1 | 0 | 1500 | 342 | $10^{12}$ |
| 2 | 0.05 | 1550 | 345 | $10^{12}$ |
| 3 | 0.10 | 1520 | 343 | $10^{12}$ |
| 4 | 0.15 | 1530 | 341 | $10^{12}$ |

As can be seen from FIG. 1 and Table 2, the core losses of the ferrite cores containing 0.05 to 0.15 wt % of $WO_3$ are reduced to as low as about 240 kW/m³, in sharp contrast to the core loss of the $WO_3$-free sample of 340 kW/m³, at 60° C. As can also be seen from Table 2, no adverse influence is found on initial permeability, saturation flux density, and surface resistance even with the addition of $WO_3$, and so it is understood that the core loss alone can be reduced with no adverse influence on these characteristics.

[Example 2]

Core samples were obtained as in Example 1 with the exception that the following composition 2 was used for the major, and subordinate components.

(Composition 2)
Major Components
$Fe_2O_3$:49.25 mol %
NiO:15.75 mol %
CuO:6 mol %
ZnO:29.0 mol %
Subordinate Component (on the assumption that the total amount of the major components was 100 wt %)
$WO_3$:0 to 0.15 wt %

Core loss ($P_{cv}$) at 20 to 160° C., 50 kHz, and 150 mT was measured for each of the samples containing 0, 0.05, 0.10, and 0.15 wt % of $WO_3$ by means of a B–H analyzer. The results are depicted in FIG. 2.

Figure 2:
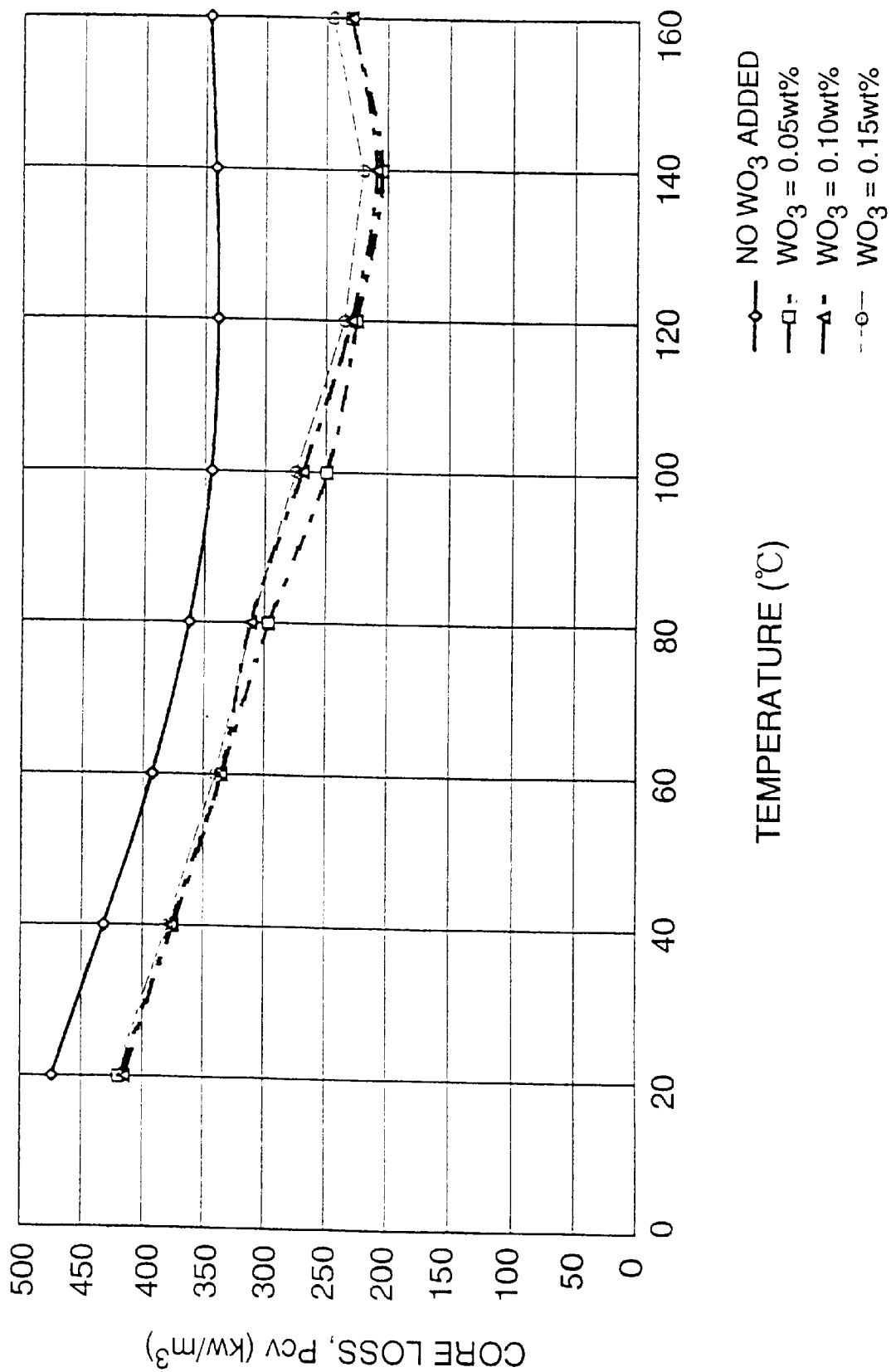
FIG. 2 is a graph obtained by plotting core losses $P_{cv}$ of samples of composition 2, with 0 to 0.15 wt % of $WO_3$ added thereto, as measured under conditions: 50 kHz–150 mT, and 20 to 160° C.

As can be seen from FIG. 2, the core losses of the ferrite cores containing 0.05 to 0.15 wt % of $WO_3$ are reduced to as low as about 240 kW/m³, in sharp contrast to the core loss of the $WO_3$-free sample of 340 kW/m³, at 120° C.

[Example 3]

A core sample was obtained as in Example 1 with the exception that the following composition 3 was used for the major, and subordinate components. A sample was similarly obtained for comparison purposes, using the following composition A.

(Composition 3)
Major Components
$Fe_2O_3$:49.25 mol %
NiO:13.5 mol %
CuO:6 mol %
ZnO:31.25 mol %
Subordinate Component (on the assumption that the total amount of the major components was 100 wt %)
$WO_3$:0.05 wt %
(Composition A)
$Fe_2O_3$:49.0 mol %
NiO:14.0 mol %
CuO:7 mol %
ZnO:30.0 mol %
No subordinate component was used.

Core loss ($P_{cv}$) at 20 to 100° C., 50 kHz, and 150 mT was measured for each sample by means of a B–H analyzer. The results are depicted in FIG. 3.

Figure 3:
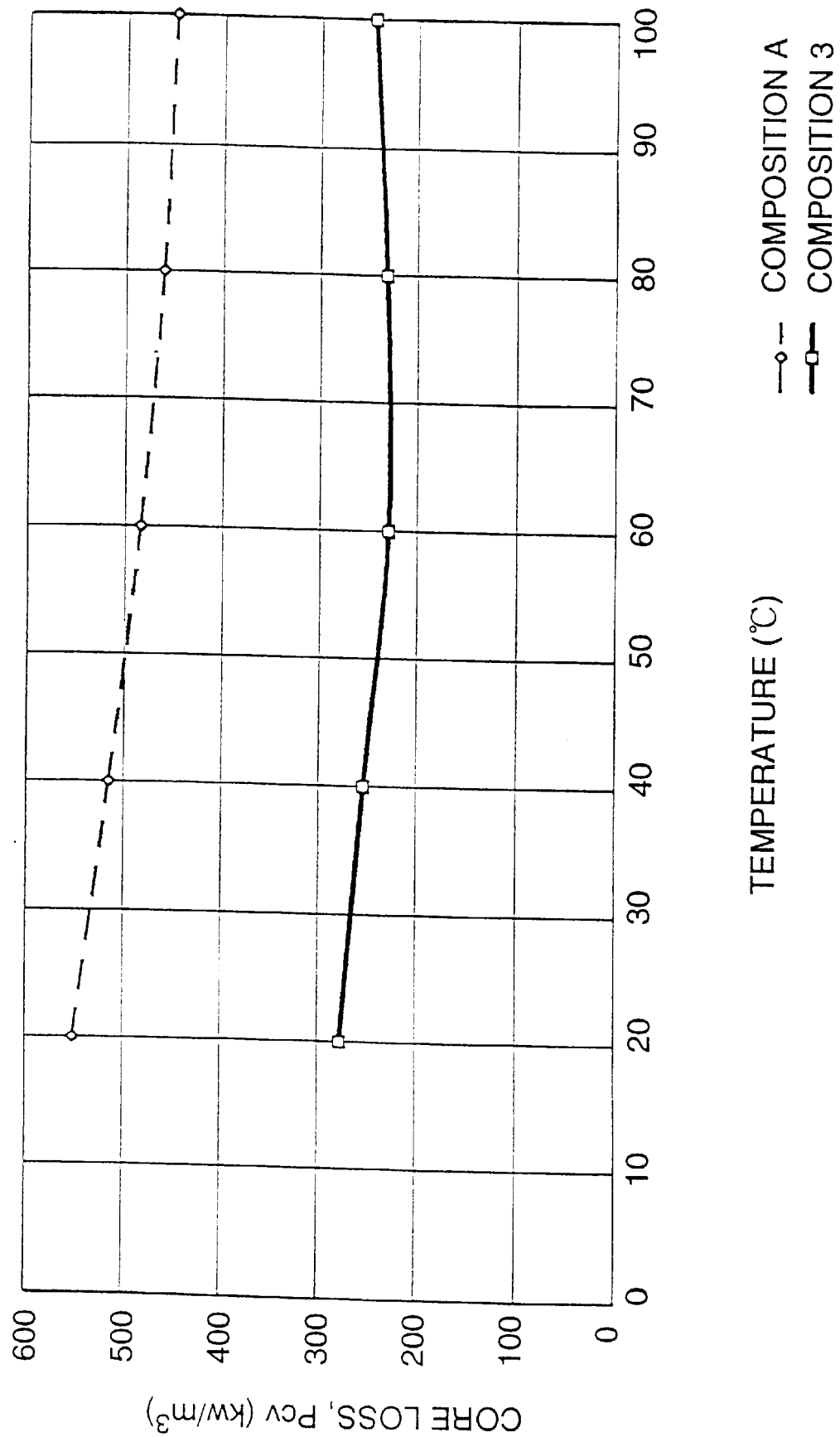
FIG. 3 is a graph obtained by plotting core losses ($P_{cv}$) of samples of composition 3 and comparative composition A, as measured by a B–H analyzer at 20 to 100° C., 50 kHz, and 150 mT.

As can be seen from FIG. 3, the core loss of the $WO_3$-containing ferrite core is reduced to as low as about 230 kW/m³, in sharp contrast to the core loss of the $WO_3$-free sample of 460 kW/m³, at 80° C.

[Example 4]

Core loss ($P_{cv}$) at 23° C., 100 kHz to 500 kHz, and 50 to 200 mT was measured for each of samples having the same composition as in Example 3 by means of a B–H analyzer. The results are depicted in FIG. 4.

Figure 4:
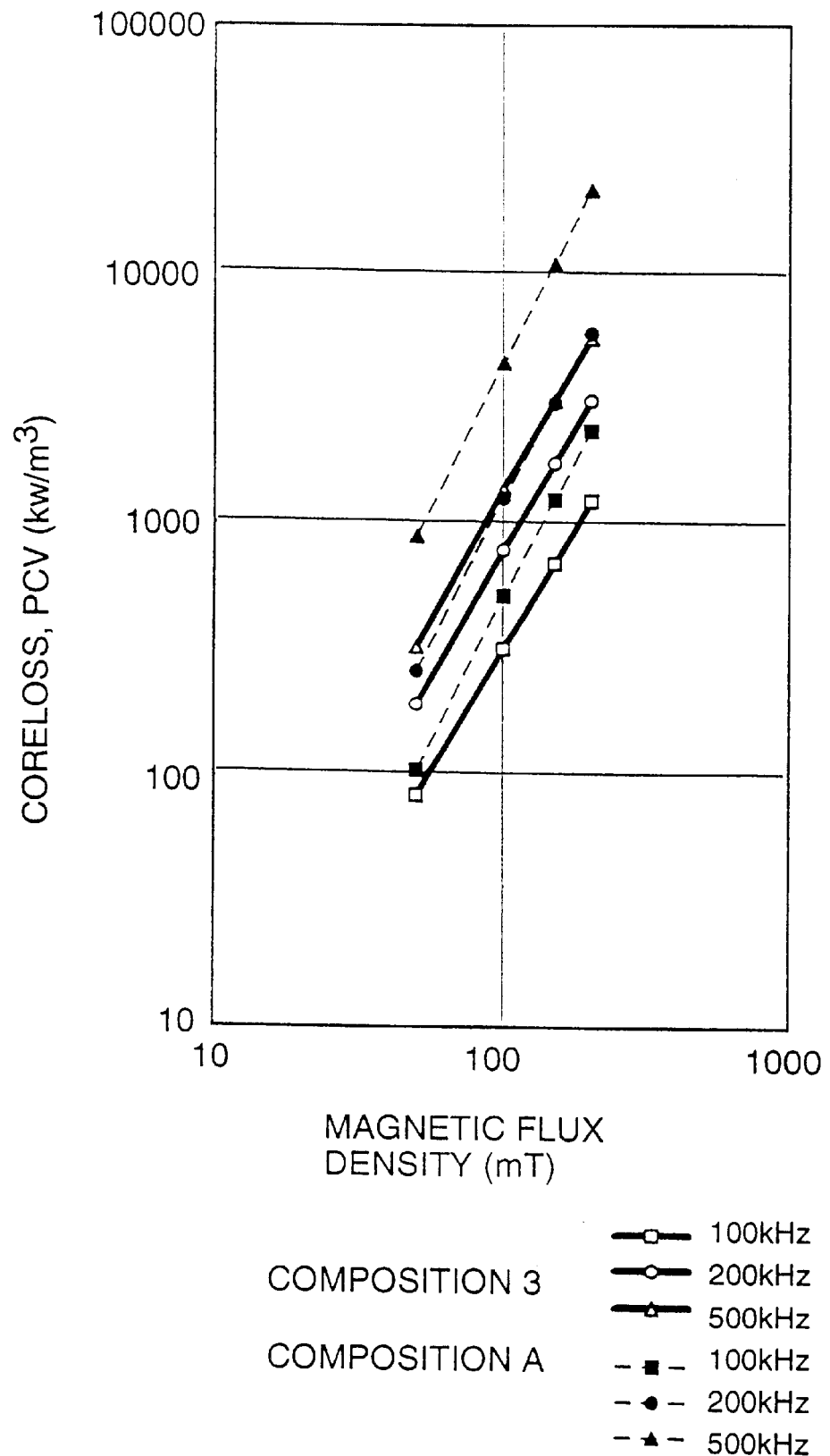
FIG. 4 is a graph obtained by plotting core loss ($P_{cv}$) of samples of composition 3 and comparative composition A, as measured by a B–H analyzer at 23° C., 100 kHz to 500 kHz, and 50 to 200 mT.

As can be seen from FIG. 4, the core losses of the $WO_3$-containing ferrite cores were largely reduced at respective frequencies.

[Example 5]

Following Example 2, a sample with 0.05 wt % of $WO_3$ added thereto was prepared, and measured by a B–H analyzer for core loss ($P_{cv}$) at 140° C., 25 kHz, and 150 mT. As a result, an extremely low value of 205 kW/m³ was obtained.

[Example 6]

Prepared was a mixture of the raw materials for the major components, $Fe_2O_3$, NiO, CuO, and ZnO with those for the subordinate components, $WO_3$, $Bi_2O_3$, CoO, and $Co_2O_3$.

The raw materials for the major, and subordinate components were weighed and mixed together such that the following composition 4 was obtained. The mixture was calcined at 800 to 900° C. for 2 hours in the air, and then pulverized. The resulting powders were formed under pressure with the addition of a binder thereto. The formed product was fired at 1,000 to 1,000° C. for 2 hours in the air to obtain a toroidal sample of 18 mm in outer diameter, 10 mm in inner diameter, and 5 mm in height.

(Composition 4)
Major Components
$Fe_2O_3$:49 mol %
NiO:18 mol %

CuO:3 mol %
ZnO:30 mol %
Subordinate Components (on the assumption that the total amount of the major components was 100 wt %)
CoO:0.4 wt %
$WO_3$:0.05 to 1.0 wt %
$Bi_2O_3$:0.2 wt %

Figure 5:
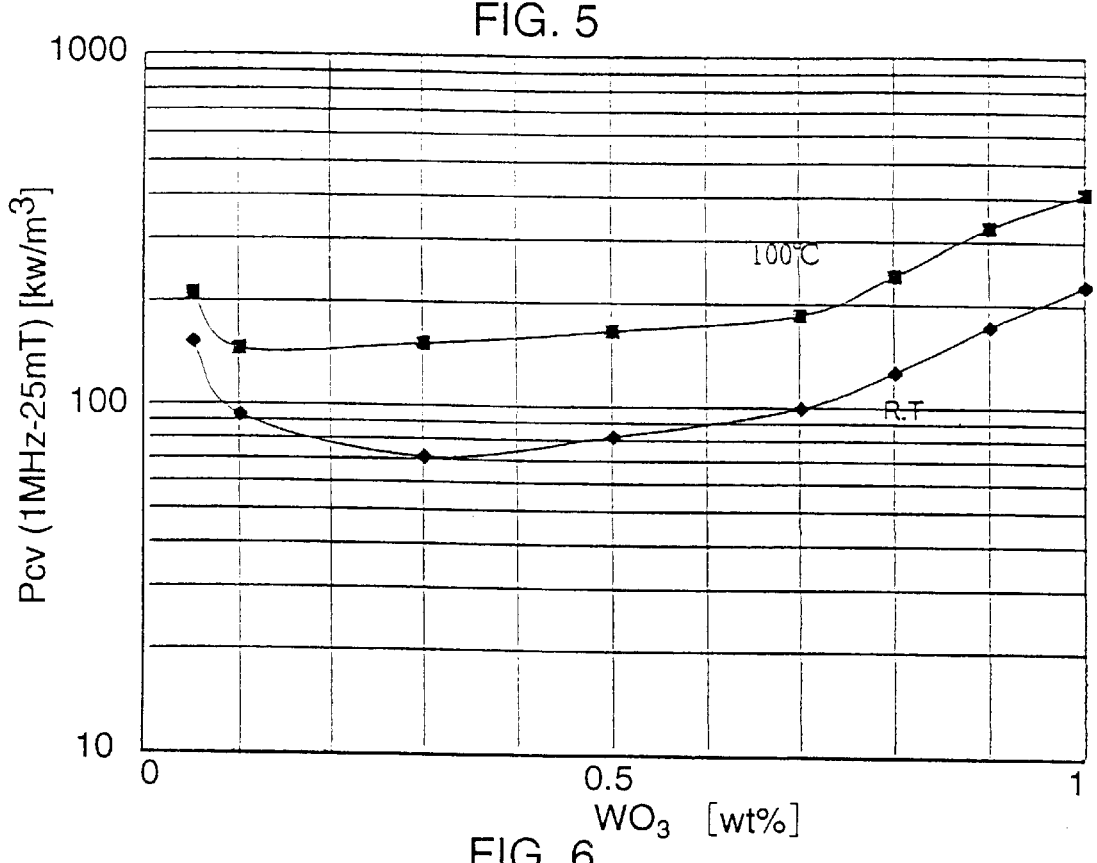
FIG. 5 is a graph obtained by plotting core losses $P_{cv}$ of ferrites of composition 4, with 0.05 to 1.0 wt % of $WO_3$ added thereto, as measured under conditions: 1 MHz–25 mT and 100° C., and 25° C. (RT).

Core loss ($P_{cv}$) at 1 MHz, and 25 mT was measured at 25° C. (shown by RT), and 100° C. for each sample by means of a B–H analyzer. The results are depicted in FIG. 5. A B–H analyzer was also used to make measurements of $\mu$Qf product under the same conditions. The results are plotted in FIG. 6.

Figure 6:
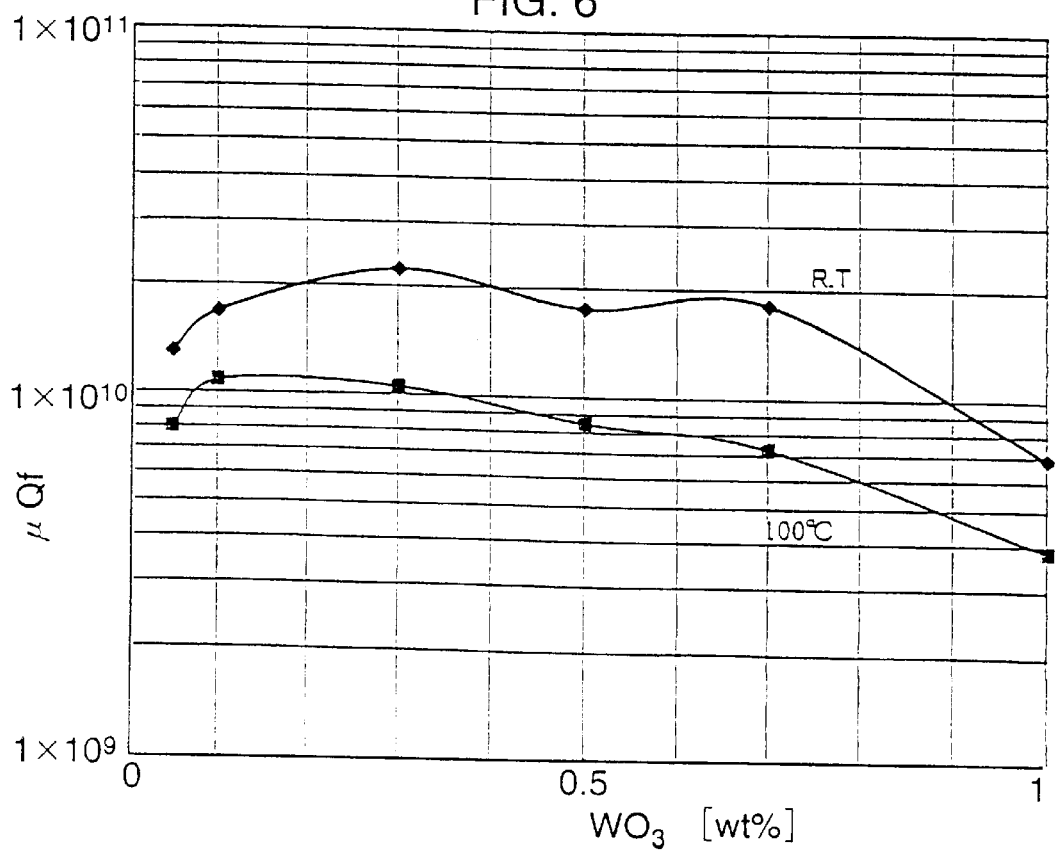
FIG. 6 is a graph obtained by plotting $\mu$Qf products of the same ferrites as in FIG. 5, as measured under conditions: 1 MHz–25 mT and 100° C., and 25° C. (RT).

As can be seen from FIGS. 5 and 6, core loss ($P_{cv}$) at 100° C. was up to 210 kW/m$^3$, and up to 180 kW/m$^3$ when the amount of $WO_3$ added is in the ranges of 0.5 to 0.75 wt %, and 0.07 to 0.5 wt %, respectively, and core loss ($P_{cv}$) at 25° C. was up to 140 kW/m$^3$, and up to 100 kW/m$^3$ when the amount of $WO_3$ added is in the ranges of 0.06 to 0.8 wt %, and 0.1 to 0.7 wt %, respectively. The $\mu$Qf product at 100° C. is at least 7×10$^9$, and at least 8×10$^9$ when the amount of $WO_3$ added is in the ranges of 0.05 to 0.75 wt %, and 0.07 to 0.5 wt %, respectively, and the $\mu$Qf product at 25° C. is at least 1×10$^{10}$, and at least 1.7×10$^{10}$ when the amount of $WO_3$ added is in the ranges of 0.06 to 0.8 wt %, and 0.1 to 0.7 wt %, respectively.

[Example 7]

Core samples were obtained as in Example 1 with the exception that the following composition 5 was used for the major, and subordinate components.

(Composition 5)
Major Components
$Fe_2O_3$:49 mol %
NiO:18 mol %
CuO:3 mol %
ZnO:30 mol %
Subordinate Components (on the assumption that the total amount of the major components was 100 wt %)
CoO:0.4 wt %
$WO_3$:0.3 wt %
$Bi_2O_3$:0.02 to 0.8 wt %

Figure 7:
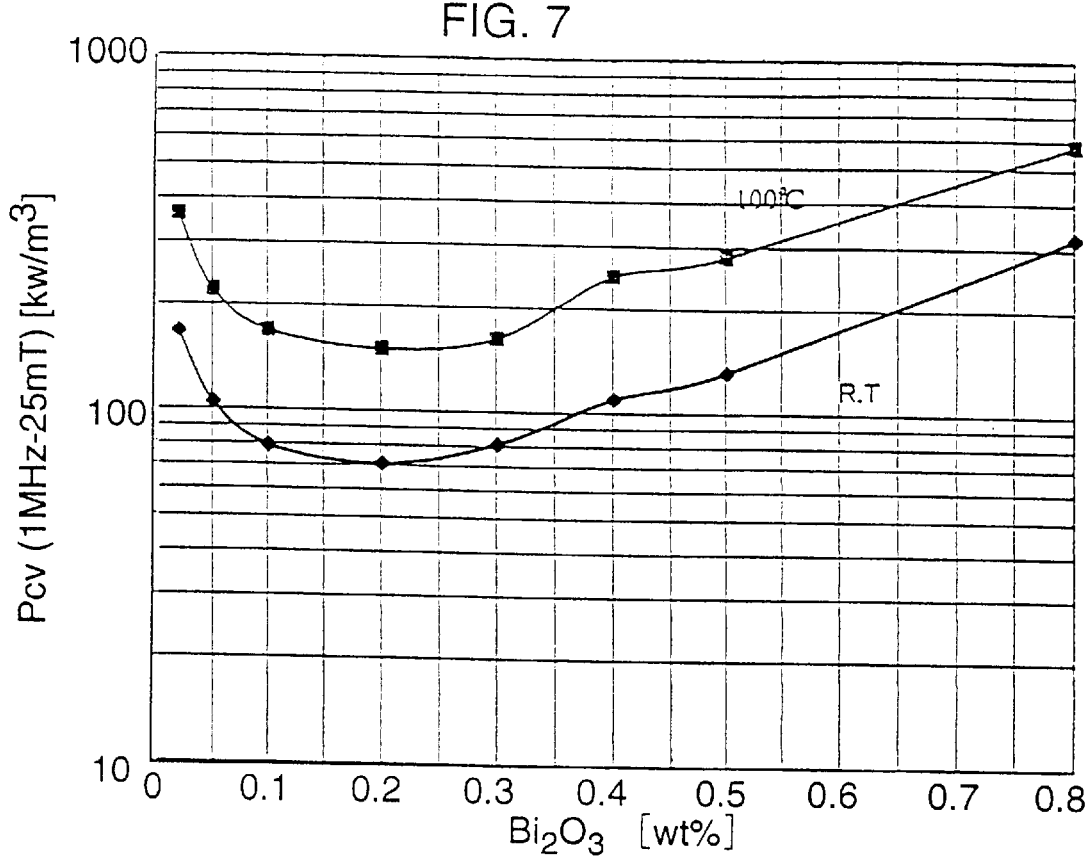
FIG. 7 is a graph obtained by plotting core losses $P_{cv}$ of ferrites of composition 5, with 0.02 to 0.8 wt % of $Bi_2O_3$ added thereto, as measured under conditions: 1 MHz–25 mT and 100° C., and 25° C. (RT).
Figure 8:
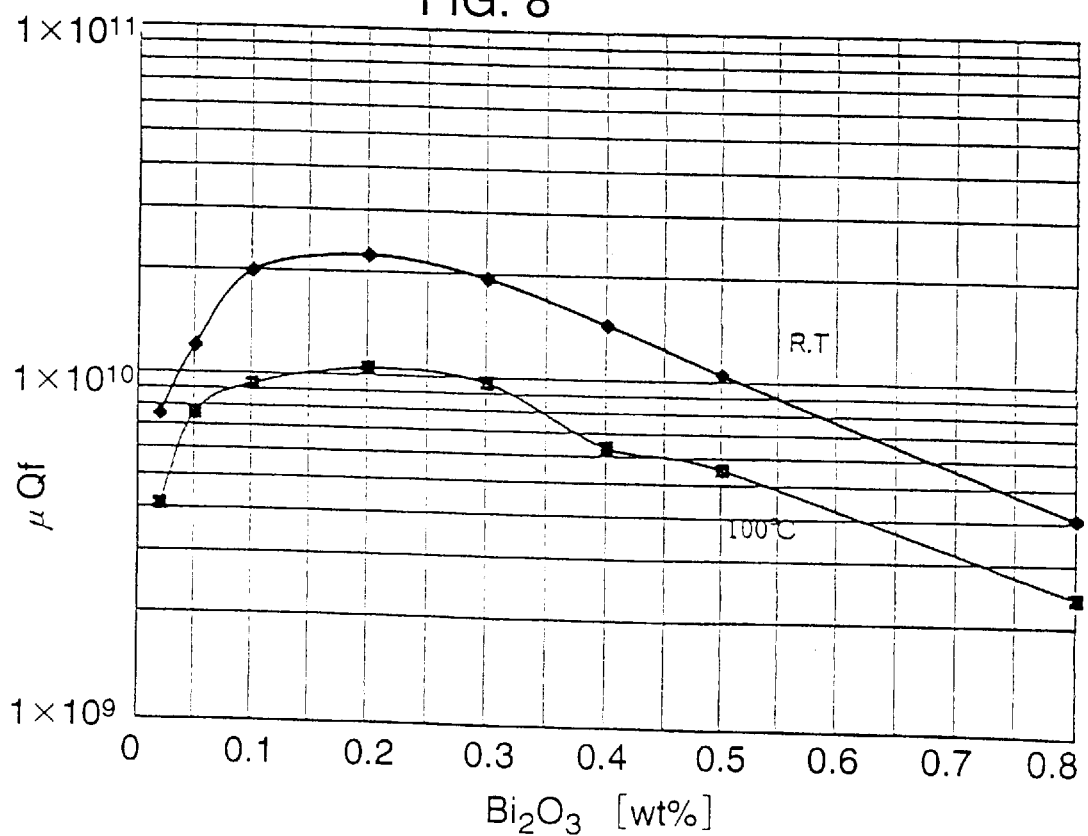
FIG. 8 is a graph obtained by plotting $\mu$Qf products of the same ferrites as in FIG. 7, as measured under conditions: 1 MHz–25 mT and 100° C., and 25° C. (RT).

Core loss ($P_{cv}$) at 1 MHz, and 25 mT was measured at 25° C. (shown by RT), and 100° C. for each sample by means of a B–H analyzer. The results are depicted in FIG. 7. A B–H analyzer was also used to make measurements of $\mu$Qf product under the same conditions. The results are plotted in FIG. 8. As can be seen from FIGS. 7 and 8, core loss ($P_{cv}$) at 100° C. was up to 300 kW/m$^3$, and up to 210 kW/m$^3$ when the amount of $Bi_2O_3$ added is in the ranges of 0.03 to 0.5 wt %, and 0.06 to 0.35 wt %, respectively, and core loss ($P_{cv}$) at 25° C. was up to 200 kW/m$^3$, and up to 140 kW/m$^3$ when the amount of $Bi_2O_3$ added is in the ranges of 0.02 to 0.65 wt %, and 0.03 to 0.5 wt %, respectively. The $\mu$Qf product at 100° C. is at least 5×10$^9$, and at least 8×10$^9$ when the amount of $Bi_2O_3$ added is in the ranges of 0.03 to 0.5 wt %, and 0.06 to 0.35 wt %, respectively, and the $\mu$Qf product at 25° C. is at least 6×10$^9$, and at least 9×10$^9$ when the amount of $Bi_2O_3$ added is in the ranges of 0.02 to 0.65 wt %, and 0.03 to 0.5 wt %, respectively.

[Example 8]

Core samples were obtained as in Example 1 with the exception that the following composition 6 was used for the major, and subordinate components.

(Composition 6)
Major Components
$Fe_2O_3$:49 mol %
NiO:18 mol %
CuO:3 mol %
ZnO:30 mol %
Subordinate Components (on the assumption that the total amount of the major components was 100 wt %)
CoO:0.05 to 2.0 wt %
$WO_3$:0.3 wt %
$Bi_2O_3$:0.2 wt %

Figure 9:
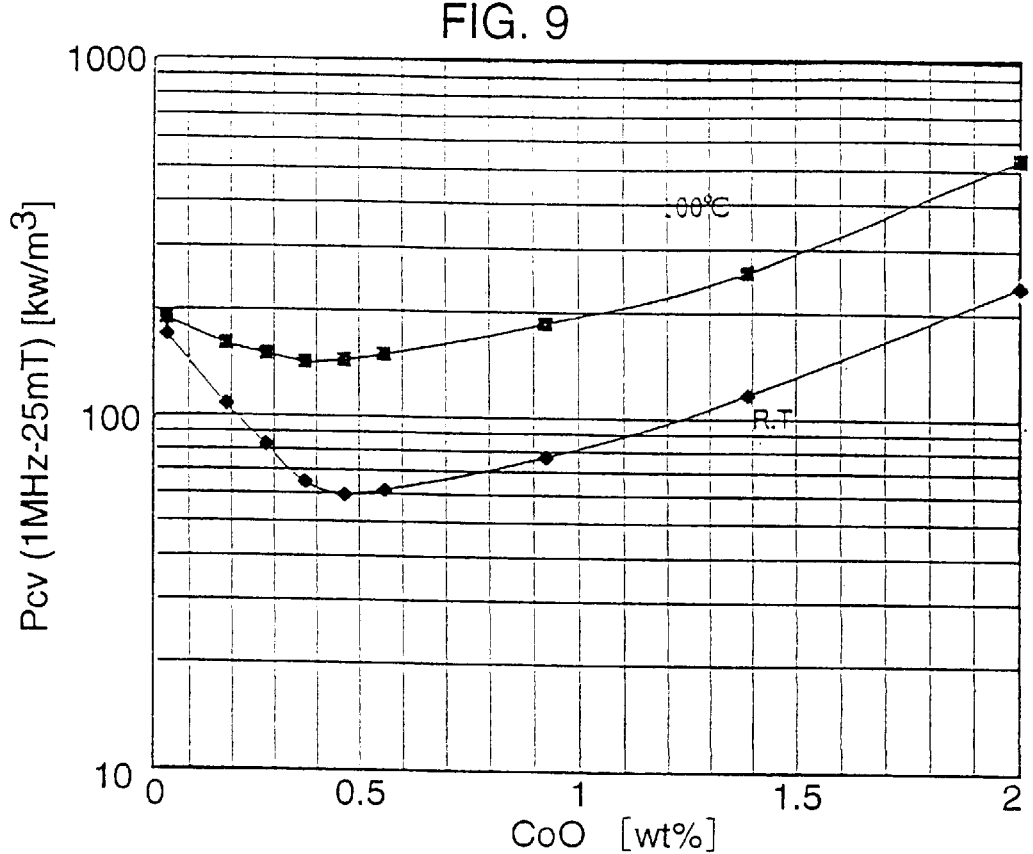
FIG. 9 is a graph obtained by plotting core losses $P_{cv}$ of ferrites of composition 6, with 0.05 to 2.0 wt % of CoO added thereto, as measured under conditions: 1 MHz–25 mT and 100° C., and 25° C. (RT).
Figure 10:
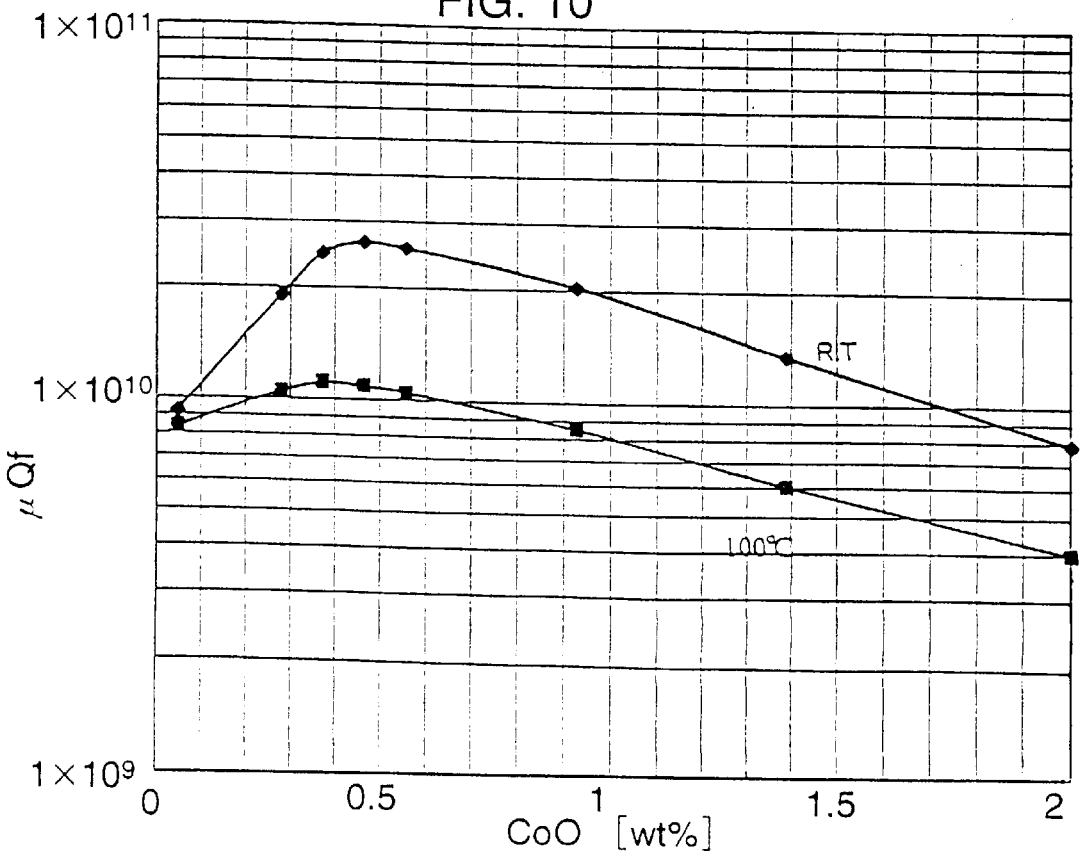
FIG. 10 is a graph obtained by plotting $\mu$Qf products of the same ferrites as in FIG. 9, as measured under conditions: 1 MHz–25 mT and 100° C., and 25° C. (RT).

Core loss ($P_{cv}$) at 1 MHz, and 25 mT was measured at 25° C. (shown by RT), and 100° C. for each sample by means of a B–H analyzer. The results are depicted in FIG. 9. A B–H analyzer was also used to make measurements of $\mu$Qf product under the same conditions. The results are plotted in FIG. 10. As can be seen from FIGS. 9 and 10, core loss ($P_{cv}$) at 100° C. was up to 250 kW/m$^3$, up to 210 kW/m$^3$, and up to 180 kW/m$^3$ when the amount of CoO added is in the ranges of 0.05 to 1.3 wt %, 0.05 to 1.1 wt %, and 0.05 to 0.9 wt %, respectively, and core loss ($P_{cv}$) at 25° C. was up to 200 kW/m$^3$, up to 140 kW/m$^3$, and up to 100 kW/m$^3$ when the amount of CoO added is in the ranges of 0.05 to 1.8 wt %, 0.1 to 1.5 wt %, and 0.2 to 1.2 wt %, respectively. The $\mu$Qf product at 100° C. is at least 6×10$^9$, at least 7×10$^9$, and at least 8×10$^9$ when the amount of CoO added is in the ranges of 0.05 to 1.3 wt %, 0.05 to 1.1 wt %, and 0.05 to 0.9 wt %, respectively, and the $\mu$Qf product at 25° C. is at least 9×10$^9$, at least 1×10$^{10}$, and at least 1.5×10$^{10}$ when the amount of CoO added is in the ranges of 0.05 to 1.8 wt %, 0.1 to 1.5 wt %, and 0.2 to 1.2 wt %, respectively.

[Example 9]

Core samples were obtained as in Example 1 with the exception that the following compositions 7 and 8 were used for the major, and subordinate components.

(Composition 7)
Major Components
$Fe_2O_3$:49 mol %
NiO:18 mol %
CuO:3 mol %
ZnO:30 mol %
Subordinate Components (on the assumption that the total amount of the major components was 100 wt %)
CoO:0.3 wt %
$WO_3$:0.7 wt %
$Bi_2O_3$:0.2 wt %

(Composition 8)
The subordinate components in composition 7 were changed to
CoO:0.4 wt %
$WO_3$:0.3 wt %
$Bi_2O_3$:0.2 wt %
(on the assumption that the total amount of the major components was 100 wt %).

Figure 11:
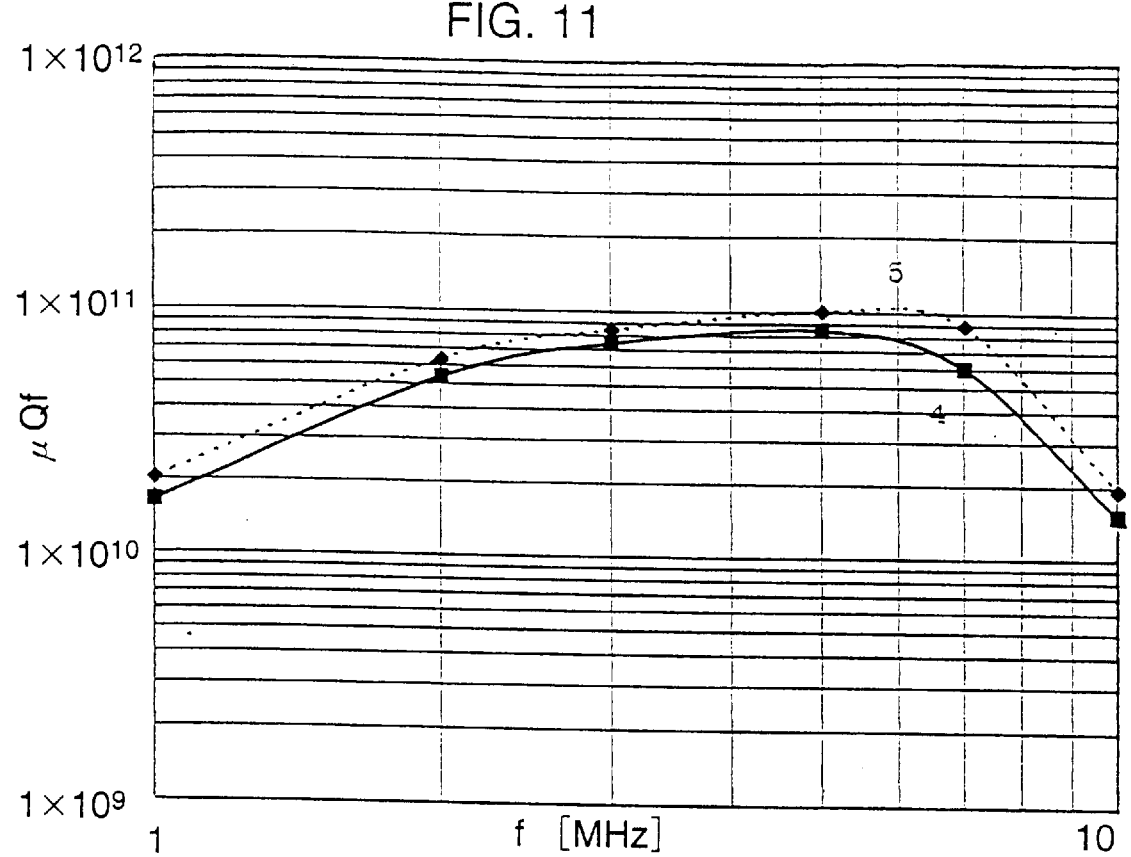
FIG. 11 is a graph obtained by plotting frequency characteristics of $\mu$Qf products of ferrites having compositions 7 and 5, as measured under a condition: f·Bm=25 kTHz.
Figure 12:
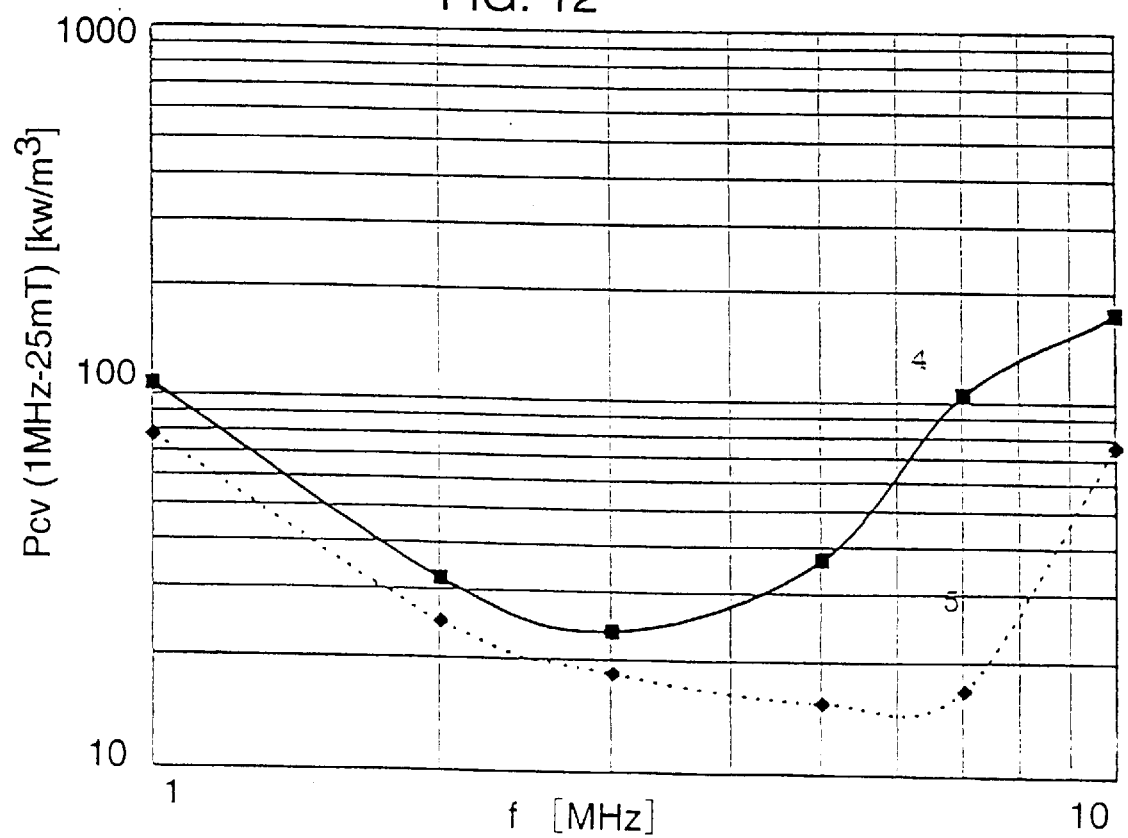
FIG. 12 is a graph obtained by plotting frequency characteristics of power losses $P_{cv}$ of ferrites having compositions 4 and 5, as measured under a condition: f·Bm=25 kTHz.
Figure 13:
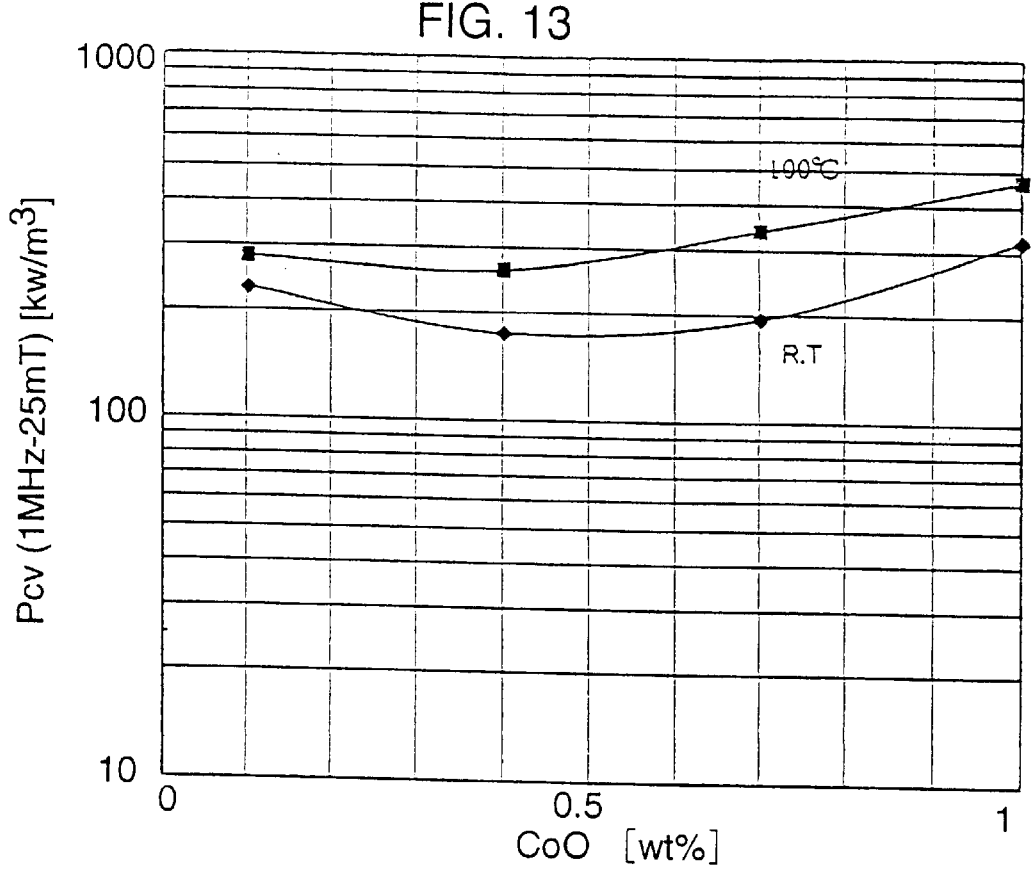
FIG. 13 is a graph obtained by plotting core losses $P_{cv}$ of conventional ferrites, with 0.1 to 1.0 wt % of CoO added thereto, as measured under conditions: 1 MHz–25 mT and 100° C., and 25° C. (RT).
Figure 14:
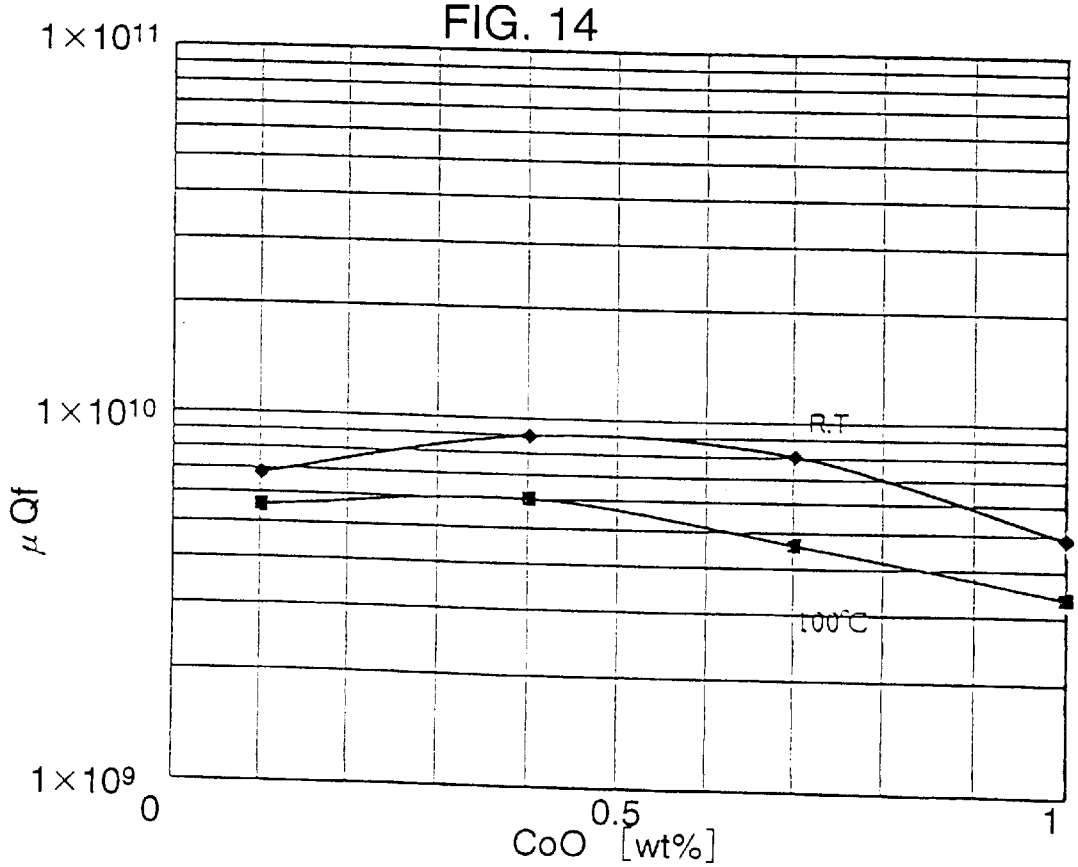
FIG. 14 is a graph obtained by plotting $\mu$Qf products of conventional ferrites, with 0.1 to 1.0 wt % of CoO added thereto, as measured under conditions: 1 MHz–25 mT and 100° C., and 25° C. (RT).

Frequency characteristics of $\mu$Qf, and $P_{cv}$ at f·Bm=25 kTHz were measured for each of the samples having compositions 7 and 8 by means of a BH analyzer. The obtained results are depicted in FIGS. 11 and 12, respectively. As can be seen from FIGS. 11 and 12, both $\mu$Qf product and $P_{cv}$ are dependent on frequency, and have their peaks lying around 2 to 6 MHz. However, it is seen that composition 8 is broader in frequency characteristics than composition 7.

[Example 10]

High voltage-generating power transformers for accelerators were fabricated using samples having the same compositions as those of the core samples of Examples 6 to 9. The obtained transformers could produce an about 30% output increase as compared with a conventional transformer.

[Example 11]

High-frequency cavities for accelerators were fabricated using samples having the same compositions as those of the core samples of Examples 6 to 9. The obtained cavities exhibited good-enough performance upon subject to particle accelerating testing.

EFFECT

According to the present invention as described above, it is possible to reduce the power loss of Ni—Cu—Zn ferrites, thereby achieving compact yet low-loss power transformers, high-performance particle accelerators, etc.

What is claimed is:

1. A ferrite magnetic material containing as major components 47 to 50 mol % iron oxide, calculated as $Fe_2O_3$, 10 to 25 mol % nickel oxide, calculated as NiO, 2 to 15 mol % copper oxide, calculated as CuO, and 25 to 35 mol % zinc oxide, calculated as ZnO, and further containing as subordinate components 0.05 to 1.5 wt % cobalt oxide, calculated as CoO, 0.05 to 0.8 wt % tungsten oxide, calculated as WO and 0.03 to 0.5 wt % bismuth oxide, calculated as $Bi_2O_3$, all based on said major components.

2. The ferrite magnetic material of claim 1, wherein a content of the iron oxide in said major components is 48 to 50 mol %, calculated as $Fe_2O_3$.

3. The ferrite magnetic material of claim 1, wherein contents of said subordinate components based on said major components are 0.1 to 1.1 wt % for the cobalt oxide, calculated as CoO, 0.06 to 0.75 wt % for the tungsten oxide, calculated as $WO_3$, and 0.06 to 0.35 wt % for the bismuth oxide, calculated as $Bi_2O_3$.

4. The ferrite magnetic material of claim 3, wherein the contents of said subordinate components based on said major components are 0.1 to 0.9 wt % for the cobalt oxide, calculated as CoO, 0.1 to 0.5 wt % for the tungsten oxide, calculated as $WO_3$, and 0.1 to 0.3 wt % for the bismuth oxide, calculated as $Bi_2O_3$.

5. A Ferrite core comprising the Ferrite material having a power loss at 100° C. of at most 210 kW/m³ and a power loss at 25° C. of at most 140 kW/m³, as measured at f·Bm product=25 kTHz where f is a frequency of 1 to 10 MHz, and Bm is a maximum magnetic flux density.

6. A particle accelerator comprising the ferrite core of claim 5.

7. A power transformer for high-frequency switching at 1 to 10 MHz comprising the ferrite core of claim 5.

* * * * *

UNITED STATES PATENT AND TRADEMARK OFFICE
CERTIFICATE OF CORRECTION

PATENT NO. : 5,906,768
DATED : MAY 25, 1999
INVENTOR(S) : Sei KAKINUMA, et al.

It is certified that error appears in the above-identified patent and that said Letters Patent is hereby corrected as shown below:

Column 13, line 32, "WO" should read --$WO_3$--.

Signed and Sealed this

Fourteenth Day of December, 1999

Attest:

Q. TODD DICKINSON

Attesting Officer

Acting Commissioner of Patents and Trademarks